W. N. ALLAN.
VEHICLE WHEEL.
APPLICATION FILED AUG. 8, 1919.
1,340,593.
Patented May 18, 1920.
2 SHEETS—SHEET 1.
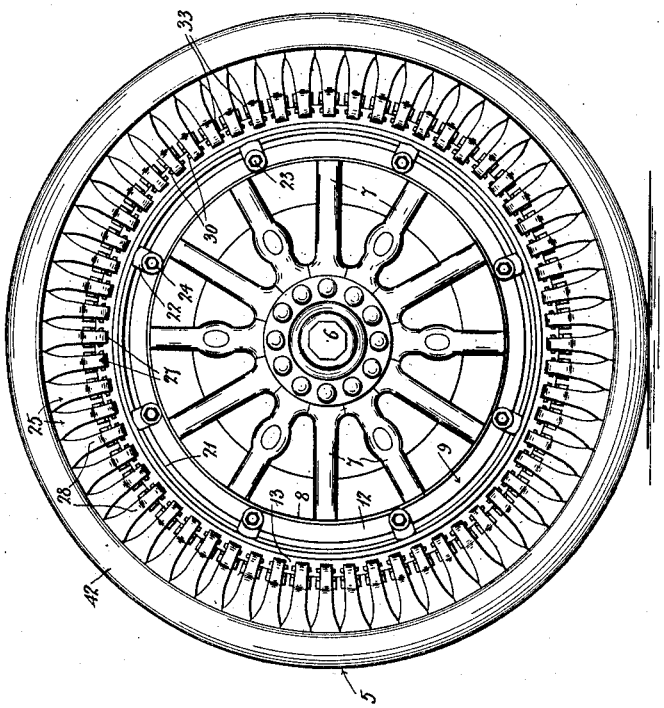
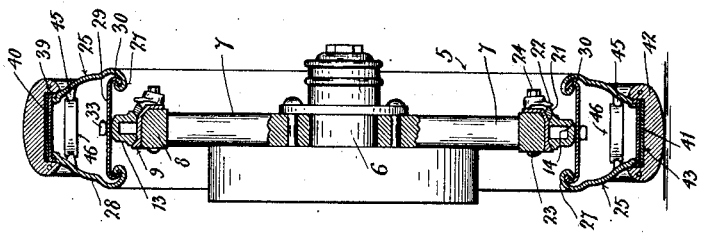
WITNESSES:
INVENTOR
William N. Allan,
BY
ATTORNEY W. N. ALLAN.
VEHICLE WHEEL.
APPLICATION FILED AUG. 8, 1919.
1,340,593.
Patented May 18, 1920.
2 SHEETS—SHEET 2.
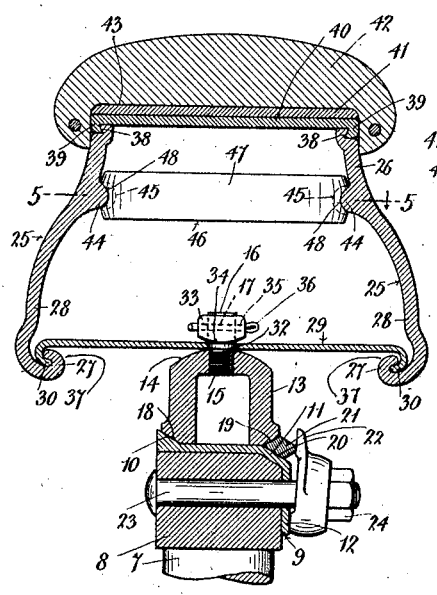
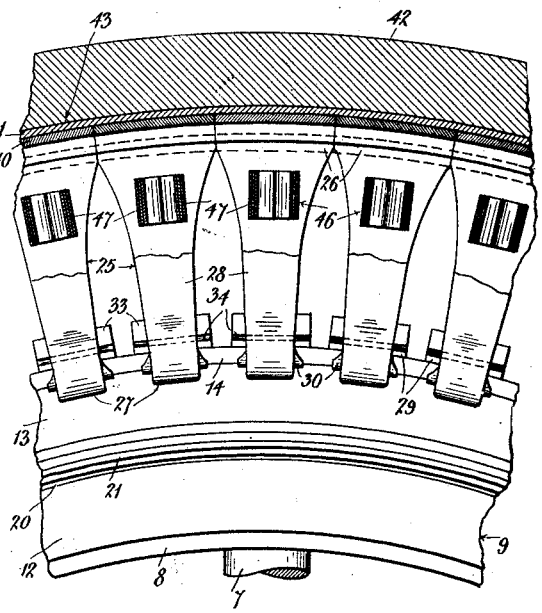
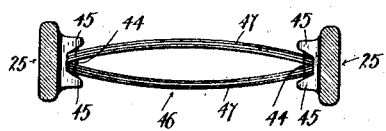
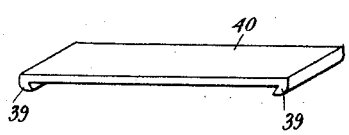
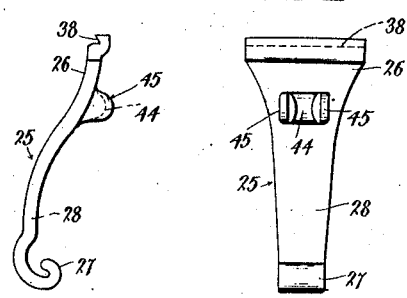
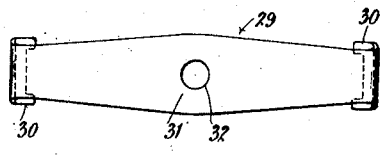
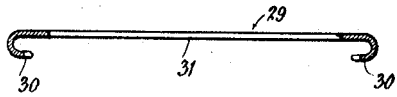
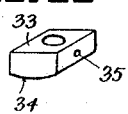
WITNESSES:
INVENTOR
William N. Allan,
BY
ATTORNEY

UNITED STATES PATENT OFFICE.

WILLIAM N. ALLAN, OF SAN ANTONIO, TEXAS.

VEHICLE-WHEEL.

1,340,593.   Specification of Letters Patent.   Patented May 18, 1920.

Application filed August 8, 1919. Serial No. 316,163.

*To all whom it may concern:*

Be it known that I, WILLIAM N. ALLAN, a citizen of the United States, residing at San Antonio, in the county of Bexar and State of Texas, have invented new and useful Improvements in Vehicle-Wheels, of which the following is a specification.

This invention relates to vehicle wheels, and particularly to a tire therefor. The present invention embodies features of improvement relatively to the constructions of tire disclosed in my pending application, Serial No. 159,702, filed April 4, 1917, and United States Patents Nos. 1,290,033, and 1,297,052, patented January 7, 1919, and March 11, 1919, respectively, and particularly to the spring band tire explained in my said Patent No. 1,297,052. The present improved tire has the same advantages in operation as in my previous tires and embodies spring and yielding means adapted to carry an equal part of the load both as to actual weight and driving stress or strain thereon. The present improved tire also embodies yielding features capable of working freely in any direction and compensating for side stress as well as angular positions to accommodate variations in the road surface over which the wheel bearing the tire may move.

The invention consists in the preferred construction and arrangement of the several parts which will be more fully hereinafter described and claimed.

In the drawings:—

Figure 1 is a side elevation of a wheel embodying the features of the invention.

Fig. 2 is a transverse central section of the improved wheel.

Fig. 3 is an enlarged vertical section of a portion of the tire, parts of the wheel being shown in elevation.

Fig. 4 is a transverse vertical section taken through the clips as shown by Fig. 3.

Fig. 5 is a horizontal section taken in the plane of the line 5—5. Fig. 4.

Fig. 6 is a detail perspective view of one of the connecting plates for the outer extremities of the clips.

Figs. 7 and 8 are respectively an end view and an inner elevation of one of the clips.

Figs. 9 and 10 are respectively a plan view and an edge view partially broken away of one of the clip connecting springs.

Fig. 11 is a detail perspective view of one of the spring securing heads.

The numeral 5 designates a wheel embodying a hub 6 and spokes 7 radiating from the hub to the felly 8 and provided with a metal rim 9 having a beveled side edge 10 projecting outwardly, the opposite side edge being struck inwardly at an angle, as at 11, and continued into a flange 12 extending over a portion of one side of the felly and held fixed to the latter. The felly, as shown, is preferably made of wood, but it is obvious that it could be constructed of metal and the periphery thereof shaped to correspond to the contour of the rim 9, the latter when used obviating wear on the felly when made of wood. The wheel is also provided with a removable rim 13 which in the present instance is hollow to lighten the same and has an outer convex edge or bearing surface 14 wherein screw studs are regularly secured, as at 15, and have outwardly projecting smooth stems 16 formed with transverse openings 17, one in each. The removable rim 13 is held on and surrounds the fixed rim 9 and the base thereof is formed with opposite bevels. as at 18 and 19, the bevel 18 fitting snugly upon the enlarged beveled side edge 10 of the rim 9 and the bevel 19 coöperating with the downward bevel 11 of the said rim 9 to form a seat 20 in which a locking or keying ring 21 is removably held by flange collars or washers 22 engaged by bolts 23 extending through the felly 8, the washers 22 being held in snug engagement with the locking or keying ring through the medium of nuts 24. It will therefore be understood that the rim 13 together with all of the parts of the tire connected thereto and carried thereby may be readily withdrawn from or applied over the felly 8 and rim 9 of the wheel 5 and when in applied position will be positively held against displacement or loose movement.

The improvement embodies a resilient tire organization held or supported by the rim 13, and the parts of this organization may be dismembered for repair and substitution without displacing the said rim 13 from applied position on the wheel. The tire organization in the present instance embodies a plurality of clips 25 with outer heads 26 from which the remaining portion of each clip tapers or converges to inner terminal hooks 27, the clips being curved outwardly, as at 28, to give ample space between the inner extremities thereof for the application and practical operation of plate springs 29 of the form particularly shown by Figs. 9 and 10. Each plate spring 29 has inwardly bent terminal hooks 30 at opposite ends, the center of the spring being increased in width, as at 31, and from which opposite portions of the spring taper toward the hooks 30. At the center each spring is formed with an opening 32 therethrough to fit over one of the stems 16 of one of the studs 15, and to hold each spring in applied position on its stem 16 a securing head or elongated nut 33 is used and applied over the stem 16, said head or nut having an inner convex side or face 34 adjacent to the outer convex edge 14 of the rim 13 and also a transverse opening 35 to coincide with the opening 17 through the stem 16 for the purpose of receiving a removable cotter pin or analogous device 36. It will be observed that the center of each spring 29 is held between two convex surfaces, and the object of this arrangement is to cause the said spring at the center to gradually follow the curvature of these opposing faces and prevent fracture of the spring at this point by avoiding engagement thereof with flat surfaces or angular projections that would obviously tend to injure the central attached portion of the spring. These opposed convex faces, and especially the convex edge 14 of the rim 13, provide for a regular bending operation of each spring in a curved form, and to carry out the same advantage the inner portions of the terminal hooks 27 of the clips 25 have regular convex edges 37 over which the adjacent portions of the extremities of each spring may bend without liability of fracture.

Each clip 25 has an overhanging shoulder or beveled seat 38 at its outer end which opens outwardly and the seats of the opposed clips at opposite sides of the tire are engaged by correspondingly shaped flanges or hook members 39 at the ends of connecting plates 40 which are resilient and serve to tie the outer ends of the clips and also provide a support for a continuous spring band 41 extending completely around the tire, and applied over the said spring band, connecting plates 40, and the outer ends of the clips 25 or the heads 26, is a resilient tread 42 preferably constructed of rubber or rubber composition and provided with a seat 43 to receive the said spring band 41 and plates 40, as clearly shown by Fig. 4. Each clip 25 near its outer end or head 26 has an inwardly projecting rib or boss 44 extending partially over the width thereof and between guard bosses or flanges 45, as shown particularly by Fig. 5. Between the ribs 44 and the bosses or flanges 45 of each pair of opposed clips, auxiliary springs 46 are interposed and comprise a series of springs 47 of equal length arranged in groups and bowed in opposite directions, the ends of the groups of springs having recesses 48 to fit over the ribs 44, the springs being held against sidewise shifting movement by the bosses or guard flanges 45, as shown by Fig. 5. These auxiliary springs operate to maintain the parts of the tire in connected relation or in operative association and also give to the tire material resilience or yielding action or augment the tire in its sensitive operation. Moreover, it will be seen that the present tire has a part thereof assembled without the use of connecting bolts or rivets, the clips 25 being connected through the springs 29 which always have a tendency to draw inwardly on the inner extremities of said clips. When the springs 29 are disconnected, the clips may be readily separated and release the auxiliary springs 46, and the assemblage of the latter springs may be readily accomplished in view of the fact that there are no fastening devices therefor, said springs being simply slipped in place between the clips in engagement with the ribs 44.

When weight pressure is exerted on the wheel and tire embodying the features of the invention, the springs 29 will be bowed downwardly or toward the auxiliary springs 46, and the tendency of this action of the springs 29 is to draw inwardly on the inner extremities of the clips 25, but this inward drawing action is materially resisted by the auxiliary springs 46 which expand and contract between the clips and also by the resilient action of the spring band 41 and the plates 40 through the pressure on the tread 42. It will therefore be seen that a multiplied resilient operation ensues in the tire when the latter is subjected to weight pressure and this action is distributed over the length of the tire or taken up by the elements of the tire in opposite directions relatively to the portion of the tire subjected to the greatest pressure, as the clips are free to compensate or accommodate themselves to this distributing resilient action of the tire. The springs 29 may be readily applied and removed without dismantling the remaining portion of the tire and all of the parts of the tire can be easily assembled, and it will be seen that the several parts are of similar form and can all be constructed from the same pattern with material economy in the cost of manufacture.

What is claimed is:

1. A tire comprising a removable rim, a series of flat springs connected to the rim, a plurality of opposed clips having their inner extremities engaged by the ends of the springs, means for connecting the outer ends of the clips, a continuous spring band bearing on said means, a yielding tread device applied over the spring band and the connecting means at the outer ends of the clips, and transversely extending spring units between the clips adjacent to the outer ends of the latter.

2. A tire comprising a removable rim, tread holding means having a tread device thereon, flat springs between the rim and parts of the tread holding means, and auxiliary spring means also interposed between parts of the tread holding means at a distance from the flat springs.

3. A tire comprising a removable rim having an outer convex surface, tread holding means disposed at opposite sides of the rim and having a tread device mounted thereover, said tread holding means having also inner terminal hooks with convex surfaces, a series of flat springs extending laterally from opposite sides of the rim adjacent to the convex surface of the latter and provided with terminal hooks separably engaging the terminal hooks of the tread holding means, a series of studs secured to the rim and having stems projecting through the springs, and securing heads with inner convex sides removably applied over the stems adjacent to the springs.

4. A tire comprising a removable rim, a plurality of oppositely disposed clips having hooked inner terminals and seats at their outer ends, a plurality of transversely extending flat springs detachably secured to the rim and having opposite hooked ends to separably engage the hooked inner terminals of the clips, connecting plates having flanges fitting in the seats at the outer ends of the clips, a continuous spring band bearing on said connecting plates, a yielding tread device fitted over the spring band and plates, and spring means interposed at intervals between the clips adjacent to the outer ends of the latter.

In testimony whereof I have hereunto set my hand in presence of two subscribing witnesses.

WILLIAM N. ALLAN.

Witnesses:
JAMES L. MURRILL,
LEWIS M. KEIZER.